US008239564B2

(12) United States Patent
Freelander et al.

(10) Patent No.: US 8,239,564 B2
(45) Date of Patent: Aug. 7, 2012

(54) DYNAMIC THROTTLING BASED ON NETWORK CONDITIONS

(75) Inventors: Jack E. Freelander, Monroe, WA (US); Christopher G. Knowlton, Redmond, WA (US); Geqiang Zhang, Redmond, WA (US); Vishal Sood, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 12/143,535

(22) Filed: Jun. 20, 2008

(65) Prior Publication Data
US 2009/0319681 A1  Dec. 24, 2009

(51) Int. Cl.
*G06F 15/16* (2006.01)
*G06F 15/173* (2006.01)
*G06F 15/177* (2006.01)

(52) U.S. Cl. ........ 709/233; 709/217; 709/219; 709/220; 709/221; 709/223; 709/224; 709/226; 709/227; 709/228; 709/230; 709/231; 709/232; 709/234

(58) Field of Classification Search .................. 709/217, 709/219–221, 223–224, 226–228, 230–234
See application file for complete search history.

(56) References Cited

U.S. PATENT DOCUMENTS

| 5,115,430 | A | 5/1992 | Hahne et al. |
| 5,280,503 | A | 1/1994 | Betts et al. |
| 5,754,765 | A | 5/1998 | Danneels |
| 5,852,609 | A | 12/1998 | Adams, III |
| 5,928,330 | A | 7/1999 | Goetz et al. |
| 6,633,918 | B2 | 10/2003 | Agarwal |
| 6,961,341 | B1 | 11/2005 | Krishnan |
| 7,197,234 | B1 | 3/2007 | Chatterton |
| 7,209,443 | B2 | 4/2007 | Mukai et al. |
| 7,260,635 | B2 | 8/2007 | Pandya et al. |
| 7,953,194 | B2 | 5/2011 | Chen |
| 2002/0133589 | A1* | 9/2002 | Gubbi et al. ............... 709/225 |
| 2002/0154694 | A1* | 10/2002 | Birch ..................... 375/240.05 |
| 2004/0100903 | A1* | 5/2004 | Han et al. .................. 370/230 |
| 2004/0103189 | A1 | 5/2004 | Cherkasova |
| 2005/0021621 | A1 | 1/2005 | Welch et al. |
| 2005/0033879 | A1 | 2/2005 | Hwang et al. |
| 2005/0044168 | A1 | 2/2005 | Pang et al. |
| 2005/0071881 | A1 | 3/2005 | Deshpande |
| 2005/0120131 | A1* | 6/2005 | Allen ........................ 709/233 |
| 2005/0276284 | A1 | 12/2005 | Krause et al. |

(Continued)

OTHER PUBLICATIONS

W. Stevens. RFC2001, "TCP Slow Start, Congestion Avoidance, Fast Retransmit, and Fast Recovery Algorithms". Internet Engineering Task Force (IETF), Request for Comments (RFC). <http://datatracker.ietf.org/doc/rfc2001/>. Published: Jan. 1997.*

(Continued)

*Primary Examiner* — Ashok Patel
*Assistant Examiner* — Kevin Bechtel
(74) *Attorney, Agent, or Firm* — Workman Nydegger

(57) ABSTRACT

The dynamic management of download rates when downloading digital resources to clients. A server concurrently maintains download sessions with any number of clients, each download session for downloading a corresponding digital resource to a corresponding client. The download rates for the various download sessions are adjusted as download sessions are completed, and as new download sessions are added. As new download sessions are initiated, a minimum and target download rate may be calculated. The target download rate is the rate at which the server will attempt to download the requested digital resource to the client, and will depend on the total available bandwidth for use to download the digital resources.

14 Claims, 5 Drawing Sheets

U.S. PATENT DOCUMENTS

| | | | |
|---|---|---|---|
| 2006/0050970 A1* | 3/2006 | Gunatilake | 382/232 |
| 2006/0165166 A1 | 7/2006 | Chou | |
| 2007/0011343 A1 | 1/2007 | Davis | |
| 2007/0016688 A1 | 1/2007 | Hester et al. | |
| 2007/0058730 A1 | 3/2007 | Bowra | |
| 2008/0049787 A1 | 2/2008 | McNaughton et al. | |
| 2008/0056135 A1 | 3/2008 | Lee et al. | |
| 2009/0161765 A1* | 6/2009 | Joyce et al. | 375/240.23 |
| 2010/0011119 A1 | 1/2010 | Knowlton | |

OTHER PUBLICATIONS

Bit Rate Throttling Configuration Walkthrough http://learn.iis.net/page.aspx/148/bit-rate-throttling-configuration-walkthrough/ (16 Pages) Nov. 23, 2007.

Providing Quality of Service on the Web Using Bandwidth Throttling http://citeseer.ist.psu.edu/cache/papers/cs/4967/http:zSzzSzwww. hpovua. orgzSzPUBLICATIONSzSzPROCEEDINGSzSz5_HPOVUAWSzSz34.pdf/hagin98providing.pdf (11 Pages).

Firefox Throttle—Bandwidth Utilization Throttling Plug-in for Firefox http://www.windowsreference.com/windows-xp/firefox-throttle-bandwidth-utilization-throttling-plug-in-for-firefox/ (6 Pages).

JsplSAPI 1.0 http://pcwin.com/Internet/Tools_Utilities/JsplSAPI/index.htm (2 Pages) Jan. 21, 2004.

Bit Rate Throttling Setup Walkthrough Sep. 25, 2007.

WebShare 242W Wireless ADSL2+ Router, 2000 (2 pages).

Video Coding for Streaming Media Delivery on the Internet Mar. 3, 2001 (13 pages).

U.S. Appl. No. 12/098,818, filed Jul. 26, 2010, Office Action.
U.S. Appl. No. 12/098,818, filed Apr. 14, 2011, Office Action.
U.S. Appl. No. 12/098,818, filed Aug. 31, 2011, Office Action.
U.S. Appl. No. 12/098,818, filed Oct. 18, 2010, Office Action.

* cited by examiner

500

| Resource Type | Minimum Rate |
|---|---|
| Type #1 | 300 kbps |
| Type #2 | 120% |
| Type #3 | 3 Mbps |
| Type #4 | 110% |
| Type #5 | 600 kbps |

DYNAMIC THROTTLING BASED ON NETWORK CONDITIONS

BACKGROUND

In network communication, a client often issues requests to a server for digital resources. The digital resource might have a bit rate associated with it. For instance, some media files or streams such as video and audio may have an associated bit rate at which the content was encoded. When the media is played at the client, the files are consumed at the encoded bit rate. Other digital resources may not have a bit rate associated with them such as, for example, executable files.

Conventionally, when a client requests a digital resource from a server, the server will issue a response at a rate that is appropriately as fast as the client is able to receive it, irrespective of any encoded bit rate associated with the digital resource. The download rate will thus depend on the bandwidth between the server and the particular client. Typically, this occurs even if the bit rate of the digital resource is much lower than the available bandwidth between the server and the client.

BRIEF SUMMARY

Embodiments described herein allow a server to dynamically manage download rates when downloading digital resources to clients. The server concurrently maintains download sessions with any number of clients. Each download session is for downloading a corresponding digital resource to a corresponding client.

In one embodiment, download sessions are maintained so as to utilize at least a majority of a predetermined portion of the available server bandwidth. As new download sessions are added, the download rates for one or more of the preexisting download sessions may be adjusted downward to accommodate the new download session. As a download session is completed, the download rates for one or more of the other remaining download sessions may be adjusted upwards. The download rates may perhaps be adjusted repeatedly and perhaps frequently, even through the duration of each response.

In one embodiment, as a new request for a particular digital resource is received, a minimum download rate is determined, and a target digital download rate is calculated. The target digital download rate may be calculated at least based on the predetermined portion of the total available server bandwidth, and may optionally also be dependent on other factors such as, for example, the type of the particular digital resource being requested.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a server dynamically manages download rates when downloading digital resources to clients. The server concurrently maintains download sessions with any number of clients, each download session for downloading a corresponding digital resource to a corresponding client. The download rates for the various download sessions are adjusted as download sessions are completed, and as new download sessions are added. First, some introductory discussion regarding computing systems will be described with respect to FIG. 1. Then, various embodiments of mechanism for dynamically managing download sessions will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not been conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
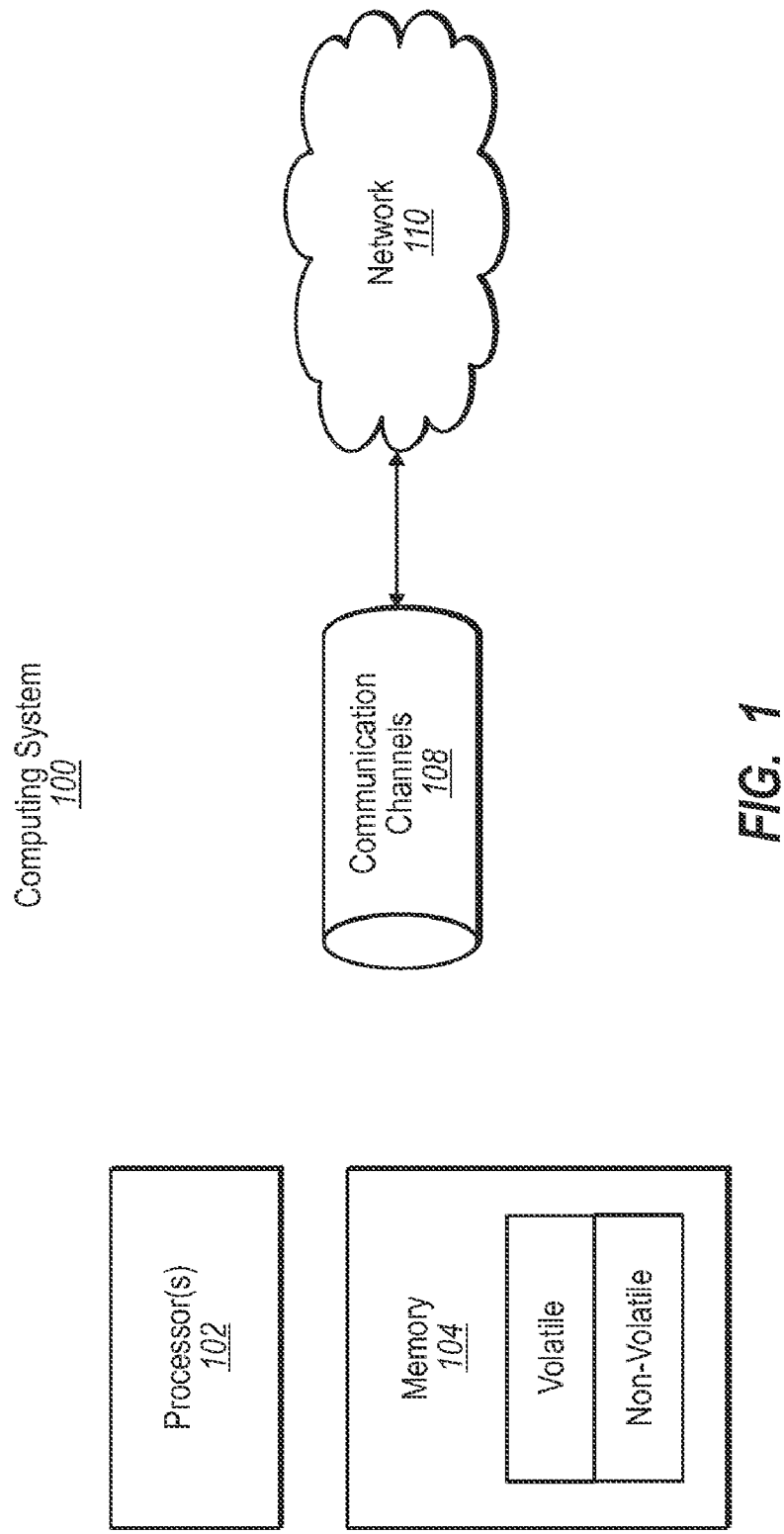
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM (random access memory), ROM (read only memory), EEPROM (electrically erasable programmable read-only memory), CD-ROM (compact disk read-only memory) or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
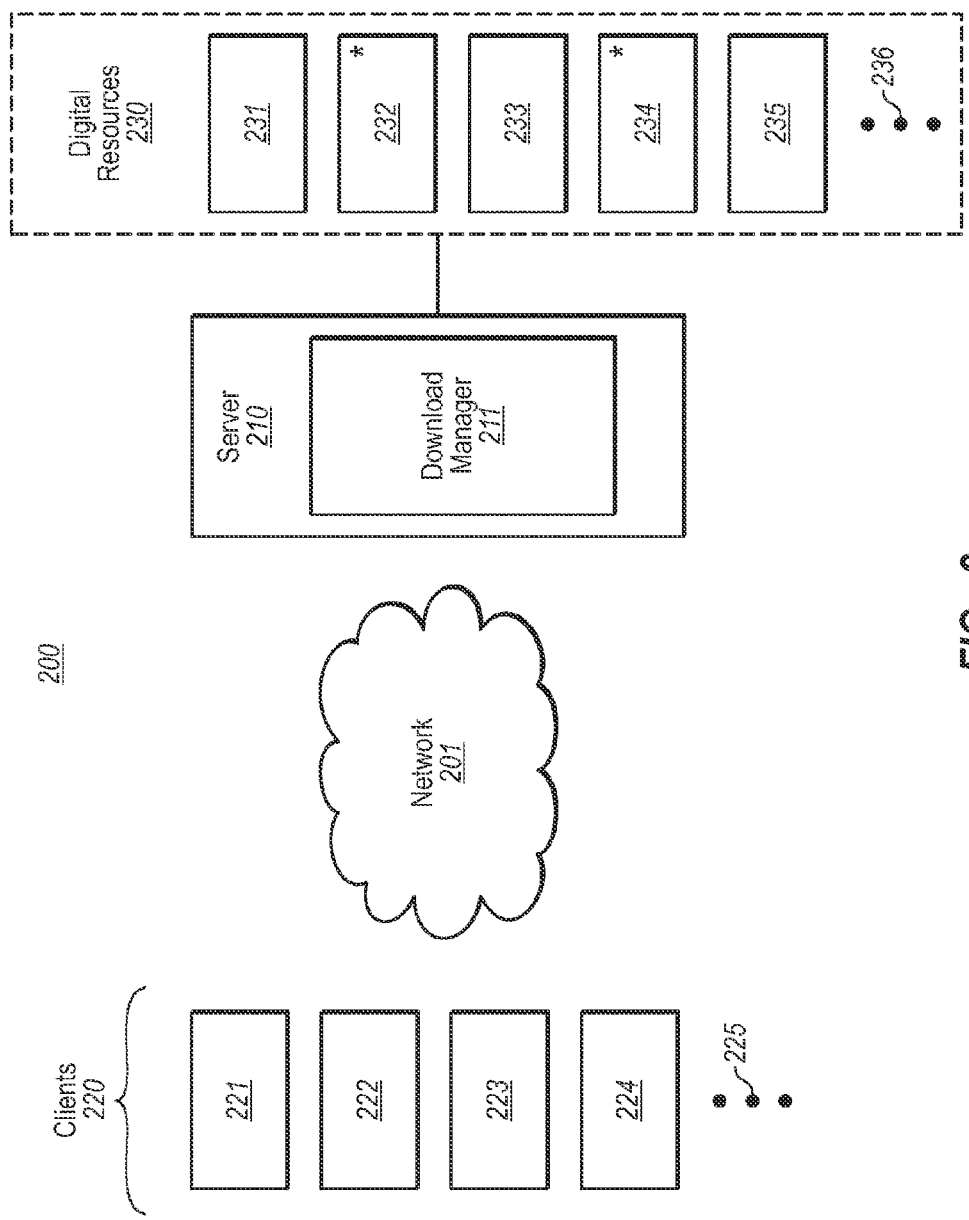
FIG. 2 illustrates an environment that includes a server and a number of clients that may submit requests for digital resources to the server over a network.

FIG. 2 illustrates an environment 200 that includes a server 210 and a plurality of clients 220 that may submit requests for digital resources to the server 210 over a network 201. In one example, the network 201 might be the Internet. However, that is not required. The network 201 may instead be another Wide-Area Network and/or perhaps a Local Area Network.

The clients 220 may include any number of clients. If, for example, the server 210 is available over the Internet, the clients 220 may be perhaps any computing system that communicate with the server 210 over the Internet. Thus, the principles of the present invention are not limited to the number of clients in communication with the server. In fact, the principles described herein quickly adjust when the number fluctuates. Nevertheless, for purposes of discussion and example only, the plurality of clients 220 are illustrated as including clients 221, 222, 223 and 224, although the vertical ellipses 225 is present as a reminder that there may be any number (one or more) of clients in communication with the server 210. The server 210 and each of the clients 220 may, but need not, be structured as described above for the computing system 100 of FIG. 1.

The server 210 has access to digital resources 230, which may be any resource that may be communicated over a network, and that is represented digitally. Examples of digital resources include video, audio, executable files, and the like. While the digital resources 230 are illustrated as including five digital resources 231, 232, 233, 234 and 235, the ellipses 236 once again represents that the principles described herein are not limited to any particular number of digital resources that are managed by the server. The digital resources may be as few as one, but may be as many as millions of digital resources.

Some of the digital resources may have a particular bit rate encoding. That bit rate specifies the rate at which the digital resource may be consumed by an application. For instance, a video or audio file may be encoded with a bit rate to specify how fast the player should consume data from the video or audio file. The bit rate specifies how fast the file should be consumed, and is not necessarily related to the speed at which the file is to be transmitted over a network for delivery. Other files have no bit rate encoding. For example, executable files would typically not have a bit rate encoding. In FIG. 2, some of the digital resources including digital resource 232 and 234 are marked with an asterisk to symbolize that these digital resources have associated bit rate encodings.

The server 210 is also illustrated as having a download management component 211, which may be hardware, software, firmware, or a combination of the same. When implemented as software, the download management component 211 may be instantiated in memory in response to be one or more computer-executable instructions being executed by one or more processors of the computing system. For instance, if performed using the computing system 100 of FIG. 1, the instructions may be read from volatile or non-volatile memory or storage, and executed by the processors 102, thereby causing the application components to be instantiated in the memory 104, such that the various methods described herein may be employed by the computing system 100.

Figure 3:
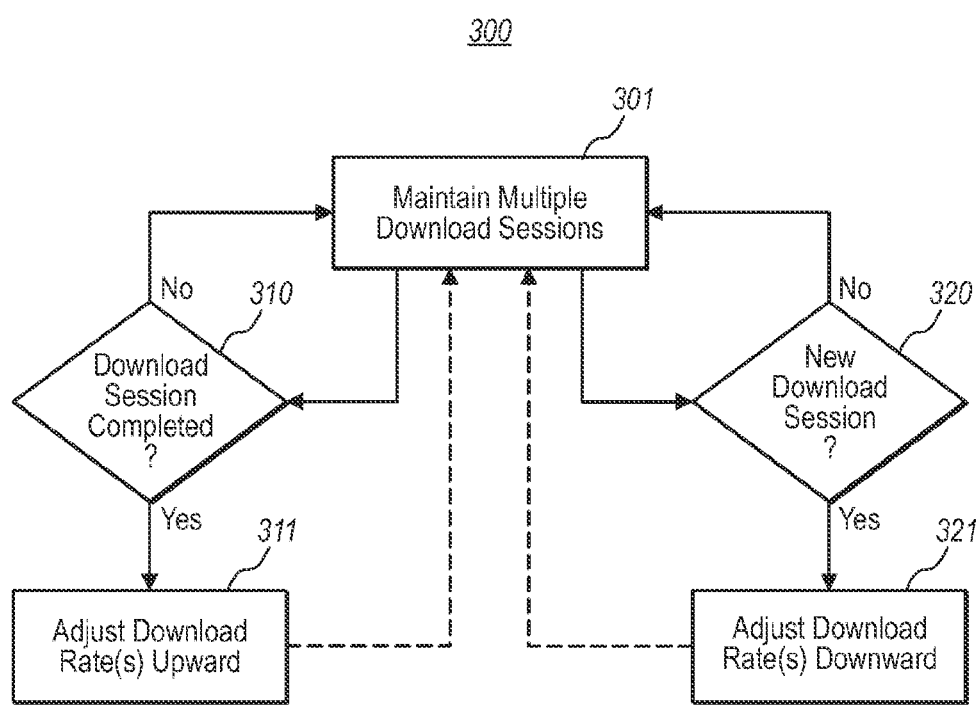
FIG. 3 illustrates a flowchart of a method for the server to manage download rates when the server downloads digital resources to clients.

FIG. 3 illustrates a flowchart of a method 300 for the server to manage download rates when the server downloads digital resources to clients. The server maintains multiple download sessions with multiple clients (act 301). Each download session is for downloading a corresponding digital resource to a corresponding client. For instance, perhaps server 210 has a download session with client 221 in which digital resource 231 is being downloaded, a download session with client 222 in which digital resource 232 is being downloaded, and a download session with client 223 in which digital resource 233 is being downloaded.

This process would be continued absent completion of any download sessions (No in decision block 310) and absent any new download sessions (No in decision block 320). However, if one of those download sessions were to complete (Yes in decision block act 310), then the download rate for one or more of the remaining sessions may be increased (act 311) to take advantage of the newly freed up bandwidth. Various examples of methods for adjusting other download rates of the remaining download sessions will be later described. The readjustment of the download speed may occur quite frequently since download sessions may be completed, and new download sessions may be started, relatively frequently.

Thus, in each download session, the download speed may be adjusted dynamically and frequently as the server starts and stops other download sessions. The download speed might also be adjusted dynamically in response as the total available bandwidth for downloading is adjusted. This adjustment of the total available bandwidth might occur due to a configuration setting change provided by an administrator, or the server itself may decide that the total available bandwidth is to be increased or reduced in response to changing circumstances.

In the case in which the total available bandwidth remains constant, if a new download session is to be initiated (Yes in decision block 320), then the download rate for one or more of the preexisting sessions may be decreased (act 321) to make room for the bandwidth to be used by the new download session. In doing this, a certain minimum acceptable threshold for the download rate is maintained for each download session. Examples of methods for adjusting in this way will also be described in detail further below. If a new download session would require more bandwidth than the server can provide without reducing download rates below the minimum, then the new download request may simply fail, or perhaps be paused until enough bandwidth is freed up as other download sessions end.

Figure 4:
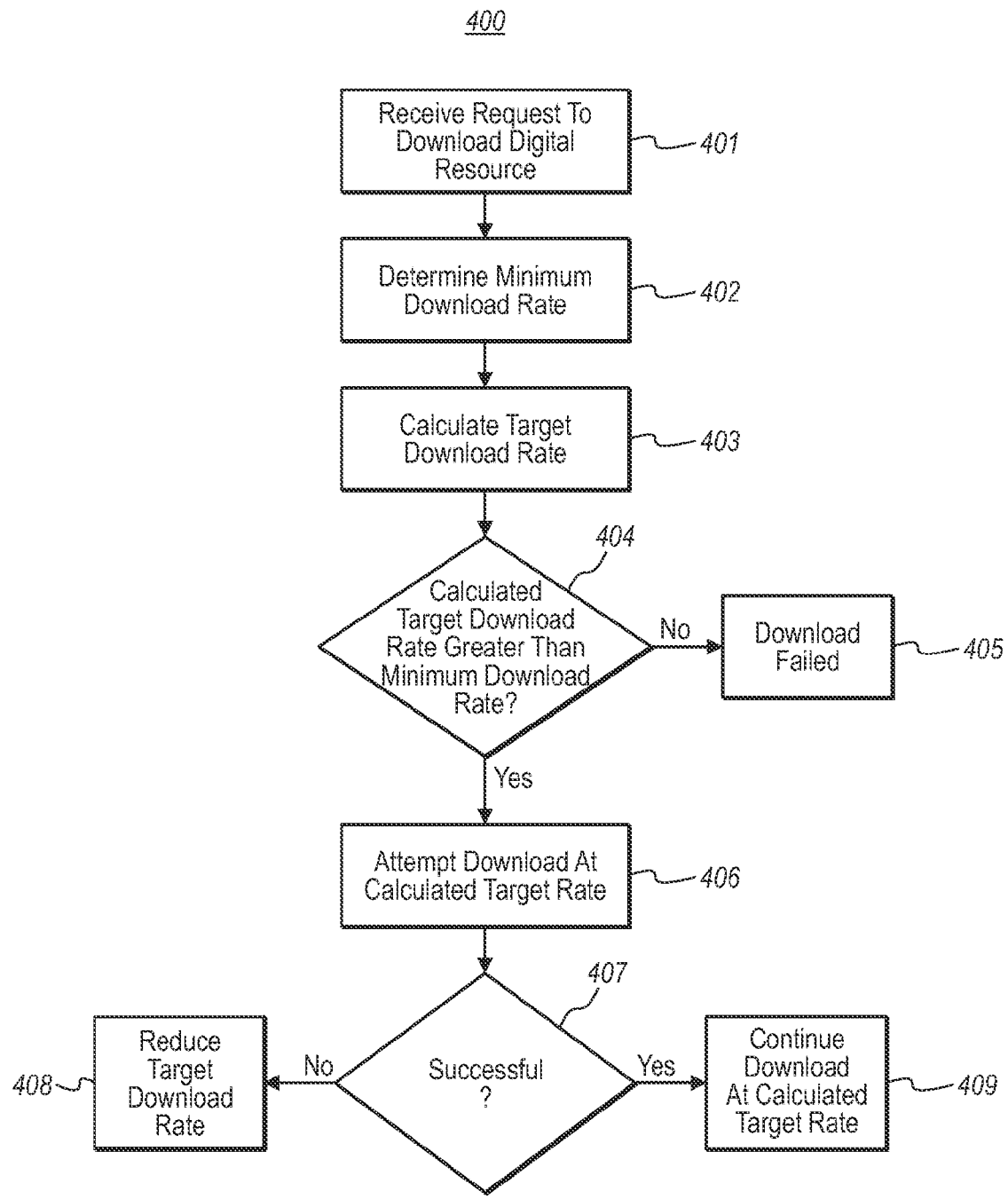
FIG. 4 illustrates a flowchart of a method for calculating a target download rate for each download session.

FIG. 4 illustrates a flowchart of method 400 for calculating a target download rate for each download session. In order to initiate a download session, the server receives a request to download a particular digital resource to a particular client (act 401). If not performed already, the server then determines a minimum download rate to use when downloading the particular digital resource to the particular client (act 402).

Perhaps the minimum download rate is a function of only the nature of the digital resource itself For example, perhaps the download rate is a function of the file type of the digital resource and/or perhaps the size of the digital resource. In the specific example that will be described in further detail, the minimum download rate is specified by file type. However, there is no requirement as to how the minimum download rate is determined for a particular digital resource.

Figures 5, 6:
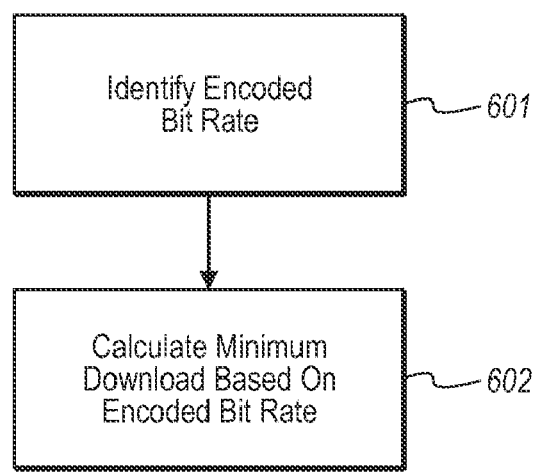
FIG. 5 illustrates a table that may be accessible to the download manager of FIG. 2 in order to determine the minimum download rate for a particular digital resource.
FIG. 6 illustrates a flowchart of a more general method for determining the minimum bit rate in the case where the bit rate is encoded into a file.

FIG. 5 illustrates a table 500 that may be accessible to the download manager 211 of FIG. 2 in order to determine the minimum download rate for a particular digital resource. In this example, the minimum download rates are specified by file type. For instance, referring to FIG. 2, perhaps each of the digital resources 231-235 are of a different file type. For example, resource 231 might be of type #1 (e.g., an executable file), resource 232 might be of type #2 (e.g., a video file), resource 233 might be of type #3 (e.g., an image file), resource 234 might be of type #4 (e.g., an audio file), and resource 235 might be of type #5 (e.g., a word processing document). Of course, the actual information may be available in other than table format. For instance, a database, or any other combination of one or more data structures may also contain this information.

In this table 500, there are two ways to specify a minimum download rate. For those digital resources that do not have an encoded bit rate, the minimum download rate is specified directly. For instance, digital resources of type #1 have a minimum download rate of 300 kilobits per second (kbps), digital resources of type #3 have a minimum download rate of 3 megabits per second (Mbps), and digital resources of type #5 have a minimum download rate of 600 kbps.

For those digital resource types that have an encoded bit rate, the minimum download rate might alternatively be expressed in terms of a percentage of the encoded bit rate. For instance, in FIG. 5, those resources of type #2 have a minimum download rate of 120 percent of the encoded bit rate. Those resources of type #4 have a minimum download rate of 110 percent of the encoded bit rate. Each of the minimum download rates of FIG. 5 may be set by an administrator or other user, or may be set by another human and/or computing entity.

FIG. 6 illustrates a flowchart of a more general method 600 for determining the minimum bit rate in the case where the bit rate is encoded into a file, which would be the case for resources of type #2 and #4 in this example of table 500 of FIG. 5. First, the encoded bit rate of the particular digital resource is identified (act 601). Then, the minimum download rate is calculated using the encoded bit rate of the particular digital resource (act 602). Specific examples of such calculation will now be provided.

Returning to the example, for digital resources of type #2 (e.g., a video file), the minimum download rate is 120 percent of the encoded bit rate. Even amongst video files of the same file extension, the encoded bit rate may differ from one file to another. If a video file were encoded with a 400 kbps bit rate, the minimum bit rate would thus be determined to be 480 kbps. If the video file were encoded with a 4 Mbps bit rate, the minimum bit rate would thus be determined to be 4.8 Mbps. Continuing the example, for digital resources of type #4 (e.g., an audio file), the minimum download rate is 110 percent of the encoded bit rate. Audio files even of the same file type may also be encoded at different bit rates from one file to another. If an audio file were encoded with a 48 kbps bit rate, the minimum bit rate would thus be determined to be 52.8 kbps. If an audio file were encoded with a 24 kbps bit rate, the minimum bit rate would thus be determined to be 26.4 kbps.

In the embodiment just described, this minimum rate is a function of the digital resource itself In other embodiments, this minimum rate is also a function of the particular client. For instance, a client that has a higher download priority may be granted a higher minimum download rate than another client that has a lower download priority.

Returning to FIG. 4, not only is a minimum download rate determined (act 402), but another target download rate is calculated that represents available bandwidth to use when downloading the particular resource to the particular client (act 403). This calculation of the download rate may be simple or complex. In one embodiment, the calculated target download rate is based at least upon an estimate of a total available server bandwidth.

In this description and in the claims, the term "total available server bandwidth" is defined as the server bandwidth that has been allocated for use using the principles described herein to download digital resources subject to the download manager that dynamically adjusts the target download rate. The term is not meant strictly to reference the actual physical bandwidth that the server is capable of providing. In some cases, however, those terms might be equal if all of the physical server bandwidth is allocated to the download manager to dynamically download digital resource files.

The calculated target download rate might also be a function of one or more parameters of the particular digital resource itself For instance, the calculated download rate may be a function of the file type or size of the digital resource. The calculated target download rate may also be a function of the current state of other download sessions currently already in progress. In one embodiment, the calculated target download rate is a function of the minimum download rate for the particular resource. For instance, the calculated target download rate may be proportional to the minimum download rate for the particular resource.

The processing flow may then differ depending on whether or not the calculated target download rate is greater than the minimum download rate for the particular resource (decision block 404). If not (No in decision block 404), the download request may fail (act 405). Alternatively, instead of failing the download request, the request might be paused until enough bandwidth is freed up through the normal ending of other download sessions. On the other hand, if the calculated target download rate is indeed greater than the minimum download rate for the particular resource (Yes in decision block 404), then the download is attempted at the calculated target download rate (act 406).

If downloading at the attempted rate is not possible (No in decision block 407), the target download rate may be reduced to a possible level (act 408), which may still be a much greater download rate than the minimum download rate. If the downloading at the target rate is possible (Yes in decision block 407), then the particular resource is downloaded at the calculated target download rate (act 409). The download rate calculated in act 403 is referred to as a "target" download rate since it is not necessarily the actual rate at which the digital resource will actually be downloaded. It is possible that although the server is capable of allocating enough bandwidth to achieve a certain bit rate, that the client is not capable of receiving at that target bit rate. That would be the case represented by No in decision block 407.

A variety of scenarios will now be provided. There are literally an unlimited number of scenarios supported by the principles described herein. Only a few will be provided only by way of illustrating how the principles of the present invention may be employed.

Suppose that the minimum download rate for all digital resources is the same at 3 Mbps. Now suppose the available server bandwidth is 300 Mbps. Upon receiving a first request to download a digital resource, the server might allocate the entire 300 Mbps to the downloading of the digital resource. The alternative would be to download at 3 Mbps, the minimum download rate. However, that would leave 297 Mbps of bandwidth unused. In this example, however, none of the bandwidth went unused. If the client were only able to receive at 100 Mbps, then still only 200 Mbps of the server bandwidth went unused.

In this same example, if a second request for a digital resource came in, that request may be honored by granting 150 Mbps to the second request, and reducing the download bit rate corresponding to the first request to 150 Mbps. Upon receiving a third request, each client would then receive the corresponding digital resource at 100 Mbps. The dynamic rebalancing would occur until the 100$^{th}$ request is received. Assuming that the download process is still proceeding for all 100 download sessions, each would then receive the corresponding digital resource at 3 Mbps. All during this time, the server bandwidth was utilized as much as possible.

To provide a more complex example, assume that there are two different types of digital resources, one (assume type 1) having a minimum download rate of 1 Mbps, and another (assume type 2) having a minimum download of 2 Mbps. The calculated download rates may then be perhaps scaled according to the minimum download rate. For instance, suppose there are seven concurrent downloads of the type 1 resources, and four concurrent downloads of the type 2 resources. In that case, each of the 7 type 1 digital resources would be downloaded at 20 Mbps, and each of the 4 type 2 digital resources would be downloaded at 40 Mbps. If 3 of the sessions in which the type 1 digital resources were to end, then the remaining 4 type 1 digital resources would have their download speed increase from 20 to 25 Mbps, while the 4 type 2 digital resources would have download speed increase from 40 to 50 Mbps.

Of course, these specific scenarios are examples only. Actual scenarios could be quite complex as the number of different minimum download speeds increases, and as other options are employed. For instance, perhaps some of the digital resources may be forced to download at the minimum download speed, rather than the calculated target download rate. Accordingly, a dynamic mechanism has been described for adjusting speeds to effectively use available server bandwidth regardless of the number and nature of the current download sessions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more storage device having stored computer-executable instructions that, when executed by one or more processors of a server, cause the server to perform a method for managing download rates for downloading digital resources to a plurality of clients, the method comprising:

an act of a server concurrently maintaining a plurality of download sessions with a plurality of download clients, each download session having a corresponding minimum download rate for downloading a corresponding digital resource to a corresponding client;

an act of adjusting downwards the download rates of at least one of the maintained download sessions when a new download session is to be initiated by the server;

an act of adjusting upwards the download rate of at least one of the maintained download sessions when a maintained download session is completed;

an act of receiving a request to download a particular digital resource to a particular client;

an act of determining the minimum download rate to use when downloading the particular digital resource to the particular client, wherein the act of determining the minimum download rate includes accessing a table that associates a plurality of different digital resource types with different corresponding minimum download rate data, the table expressing, for digital resource types that have corresponding encoded bit rates, the minimum download rate data as percentage data to be multiplied by the corresponding encoded bit rates to obtain the minimum download rate whenever the particular digital resource includes an encoded bit rate, the table also expressing, for digital resource types that do not have known corresponding encoded bit rates, the minimum download rate data as specified bit rates to, alternatively, use as the minimum download rate whenever the particular digital resource does not have a known encoded bit rate;

an act of calculating a target download rate to attempt to use when downloading the particular digital resource to the particular client, the calculated target download rate being based at least upon the minimum download rate, as well as an estimate of a total available server bandwidth; and an act of determining that the calculated target download rate is greater than the minimum download rate and thereafter attempting to download the particular digital resource to the particular client at the calculated target download rate, wherein the calculated target download rate and the download rates of the maintained download sessions are scaled in an equally proportional manner relative to their corresponding minimum download rates.

2. The one or more storage device in accordance with claim 1, wherein the one or more storage device comprises system memory of the server.

3. The one or more storage device in accordance with claim 2, wherein the plurality of download sessions are for downloading media files that have an encoded bit rate, as well as other files that do not have an encoded bit rate.

4. A computer-implemented method for a server managing download rates for downloading digital resources to a plurality of clients, the method comprising:
   an act of a server concurrently maintaining a plurality of download sessions with a plurality of download clients, each download session having a corresponding minimum download rate for downloading a corresponding digital resource to a corresponding client;
   an act of adjusting downwards the download rates of at least one of the maintained download sessions when a new download session is to be initiated by the server;
   an act of adjusting upwards the download rate of at least one of the maintained download sessions when a maintained download session is completed;
   an act of receiving a request to download a particular digital resource to a particular client;
   an act of determining the minimum download rate to use when downloading the particular digital resource to the particular client, wherein the act of determining the minimum download rate includes accessing a table that associates a plurality of different digital resource types with different corresponding minimum download rate data, the table expressing, for digital resource types that have corresponding encoded bit rates, the minimum download rate data as percentage data to be multiplied by the corresponding encoded bit rates to obtain the minimum download rate whenever the particular digital resource includes an encoded bit rate, the table also expressing, for digital resource types that do not have known corresponding encoded bit rates, the minimum download rate data as specified bit rates to, alternatively, use as the minimum download rate whenever the particular digital resource does not have a known encoded bit rate;
   an act of calculating a target download rate to attempt to use when downloading the particular digital resource to the particular client, the calculated target download rate being based at least upon the minimum download rate, as well as an estimate of a total available server bandwidth; and
   an act of determining that the calculated target download rate is greater than the minimum download rate and thereafter attempting to download the particular digital resource to the particular client at the calculated target download rate, wherein the calculated target download rate and the download rates of the maintained sessions are scaled in an equally proportional manner relative to their corresponding minimum download rates.

5. A method in accordance with claim 4, wherein the calculated target download rate is also based upon one or more parameters of the particular digital resource.

6. A method in accordance with claim 5, wherein the one or more parameters of the particular digital resource includes a file type of the particular digital resource.

7. A method in accordance with claim 5, wherein the one or more parameters of the particular digital resource include a file size of the particular digital resource.

8. A method in accordance with claim 4, wherein the calculated target download rate is also based on a state of one or more concurrent download sessions that the server is presently supporting.

9. A method in accordance with claim 8, further comprising:
   an act of adjusting a plurality of download rates corresponding to the plurality of maintained download sessions downwards to accommodate bandwidth for the particular digital resource to be downloaded to the particular client at the target download rate.

10. A method in accordance with claim 4, wherein the act of determining a minimum download rate to use when downloading the particular digital resource to the particular client further comprises:
    an act of identifying a file type of the particular resource within the table.

11. A method in accordance with claim 4, wherein the act of determining a minimum download rate to use when downloading the particular digital resource to the particular client further comprises:
    an act of identifying an encoded bit rate of the particular digital resource;
    an act of identifying a file type of the particular resource; and
    an act of multiplying the minimum download rate data, which corresponds to the file type of the particular resource within the table, with the encoded bit rate of the particular digital resource.

12. The method recited in claim 4, wherein a plurality of the maintained download sessions download digital resources of a first type and a plurality of the maintained download sessions download digital resources of a second type, and wherein the method includes ensuring that all digital resources of the, first type are downloaded at a first download rate, as well as ensuring that all digital resources of the second type are downloaded at a second download rate which is different that the first download rate.

13. The method recited in claim 12, wherein the method includes the server dynamically adjusting download rates of the plurality of maintained download sessions to ensure a same adjusted download rate is targeted for all digital resources of a same type whenever one or more new download sessions are initiated and whenever one or more of the plurality of maintained download sessions are completed.

14. The method recited in claim 4, wherein the method further includes determining that limitations of the particular client prevent the particular client from being able to receive the digital resource at the calculated target download rate;
    an act of reducing calculated target download rate to a new download rate somewhere between the calculated target download rate and the minimum download rate; and
    downloading the particular digital resource to the particular client at the new download rate.

* * * * *